US006493688B1

(12) United States Patent
Das et al.

(10) Patent No.: US 6,493,688 B1
(45) Date of Patent: Dec. 10, 2002

(54) APPARATUS FOR RECEIVING PROGRAMS

(75) Inventors: Duco A. D. Das, Eindhoven (NL); Paul M. Van Loon, Eindhoven (NL); Joanne H. D. M. Westerink, Eindhoven (NL); Christian P. W. Bakker, Eindhoven (NL)

(73) Assignee: Koninklijke Philips Electronic N.V., Eindhoven (NL)

(*) Notice: Subject to any disclaimer, the term of this patent is extended or adjusted under 35 U.S.C. 154(b) by 0 days.

(21) Appl. No.: 09/440,765

(22) Filed: Nov. 16, 1999

(30) Foreign Application Priority Data

Nov. 16, 1998 (EP) .............................. 98203846

(51) Int. Cl.⁷ ......................... G06E 3/00; G06F 17/60
(52) U.S. Cl. ...................... 706/20; 705/10; 725/116; 345/721
(58) Field of Search ................. 706/20; 705/10; 725/116; 345/721

(56) References Cited

U.S. PATENT DOCUMENTS

| 5,710,605 A | | 1/1998 | Nelson ........................ 348/734 |
| 5,758,257 A | * | 5/1998 | Herz et al. ................... 725/116 |
| 5,801,747 A | | 9/1998 | Bedard ......................... 725/46 |
| 5,920,477 A | * | 7/1999 | Hoffberg et al. ............. 382/181 |
| 5,973,683 A | * | 10/1999 | Cragun et al. ............... 345/327 |
| 5,977,964 A | * | 11/1999 | Williams et al. ............. 345/721 |
| 5,983,214 A | * | 11/1999 | Lang et al. ..................... 707/1 |
| 6,020,883 A | * | 2/2000 | Herz et al. ................... 345/327 |
| 6,029,195 A | * | 2/2000 | Herz et al. ................... 725/116 |
| 6,049,777 A | * | 4/2000 | Sheena et al. ................ 705/10 |
| 6,088,722 A | * | 7/2000 | Herz et al. ................... 709/217 |
| 6,092,049 A | * | 7/2000 | Chislenko et al. ............ 705/10 |
| 6,112,186 A | * | 8/2000 | Bergn et al. .................. 705/10 |
| 6,260,192 B1 | * | 7/2001 | Rosin et al. .................. 725/39 |
| 6,301,707 B1 | * | 10/2001 | Carroll et al. ............... 717/177 |

FOREIGN PATENT DOCUMENTS

EP            0854645 A2     7/1998

\* cited by examiner

*Primary Examiner*—George B. Davis
(74) *Attorney, Agent, or Firm*—Laurie E. Gathman

(57) ABSTRACT

The invention relates to an apparatus for receiving a multitude of programs which may be classified by a first and a second attribute. For example, a program may be classified by a channel name and a program category. The apparatus is capable of defining one or more user profiles which comprise ratings for some or all combinations of values of the first and the second attribute. Thus, a user can supply preferences in a very precise way. The user profile influences the behavior of various components, such as the zap function and the electronic program guide.

14 Claims, 2 Drawing Sheets

|        | NED 1 | NED 2 | BBC 1 | BBC 2 | WDR 3 | ... |
|--------|-------|-------|-------|-------|-------|-----|
| NEWS   | ✓     |       | ✓     |       | ✓     |     |
| SPORTS |       | ✓     |       | ✓     |       |     |
| MUSIC  | ✓     |       |       | ✓     | ✓     |     |
| MOVIES |       | ✓     | ✓     |       | ✓     |     |
| SHOWS  | ✓     |       |       | ✓     |       |     |
| QUIZZES|       | ✓     |       |       |       |     |
| ADULTS | ✓     |       | ✓     |       | ✓     |     |
| ...    |       |       |       |       |       |     |

|  | NED 1 | NED 2 | BBC 1 | BBC 2 | WDR 3 | ... |
|---|---|---|---|---|---|---|
| NEWS | ✓ |  | ✓ |  |  |  |
| SPORTS |  | ✓ |  | ✓ |  |  |
| MUSIC | ✓ | ✓ |  | ✓ | ✓ |  |
| MOVIES |  | ✓ | ✓ | ✓ | ✓ |  |
| SHOWS |  | ✓ |  | ✓ |  |  |
| QUIZZES | ✓ |  | ✓ |  | ✓ |  |
| ADULTS |  |  |  |  |  |  |
| ... |  |  |  |  |  |  |

FIG. 2

APPARATUS FOR RECEIVING PROGRAMS

BACKGROUND OF THE INVENTION

The invention relates to an apparatus for receiving a multitude of programs, said programs being classified by at least a first and a second attribute, the apparatus comprising user-operable profiling means for defining a subset of said multitude of programs constituting a user profile.

The invention also relates to a method of establishing a subset of a multitude of programs, said programs being classified by at least a first and a second attribute, the method comprising a step of defining a user profile.

An apparatus as defined above is widely known. For example, a TV receiver receives TV programs which can be classified by various attributes, such as the channel name, e.g. CNN, BBC, and the program category (e.g. news, sports, movies). The development of, in particular, digital television will dramatically increase the number of programs which can be received simultaneously, making it more difficult for viewers to select a suitable program. Recently, features have been introduced to help the user make a choice, e.g. by filtering the received programs in accordance with user-supplied preferences. For example, some known TVs enable a user to enter a 'favorite channel list' for limiting, in a particular mode of the TV, the number of programs which are to be selected in a zap-circle or are included in an electronic program guide (EPG). When the user operates the zap keys, channels which are not included in the favorite channel list are skipped. The EPG will present only information related to programs which are broadcast through the channels in the favorite channel list. It is also known to limit the information presented by an EPG to programs of a specific category. Information about a program's category may be supplied by the content provider, e.g. included in a dedicated teletext page or as part of the service information (SI) of a digital broadcast stream.

SUMMARY OF THE INVENTION

It is an object of the invention to provide an apparatus having more accurate means for filtering received programs in accordance with user-supplied preferences. To this end, the apparatus according to the invention is characterized in that the user profile comprises a rating for a value combination of at least a value of the first attribute and a value of the second attribute, the rating determining whether a program classified by said value combination is a member of said subset. Rating individual value combinations, e.g. by means of like/dislike markers, enables dependencies between attributes to be taken into account. For example, the user profile may contain a positive rating for news reports on particular channels, e.g. CNN and BBC, and a negative rating for news reports on all other channels. For other program categories, e.g. movies, another set of preferred channels may be specified. In such a way, a very detailed user profile can be established, allowing an accurate estimation of those programs that will be appreciated by the user. Other attributes may be used as well, e.g. the time of day or the duration could be a further factor in determining whether a program will be appreciated by the user. Other factors may be language, presence of subtitles, bilingual broadcasting, black and white programs, etc.

In an embodiment of the invention, the user profile determines which programs are included in a zap-circle. For example, when the user operates the channel-up or channel-down keys, only programs having a value combination with a positive rating will be selected. Other programs will be skipped automatically.

In a further embodiment of the invention, the user profile determines which programs are presented in an electronic program guide (EPG). For example, when the user requests an overview of the programs to be broadcast in the next few hours, only programs having a value combination with a positive rating are presented, or alternatively, made more prominent in comparison with other programs.

A further embodiment of the invention according to the invention is characterized in that the profiling means are arranged to simultaneously assign the same rating to all value combinations which contain a specific value of a specific attribute. For example, a user may assign a positive rating to all BBC programs at once, irrespective of their category or further properties, or assign a negative rating to all sports programs, irrespective of the channel or further properties. A user profile comprising ratings for combinations of two attributes may easily be represented as a matrix, e.g. having a row for each program category and a column for each channel. A rating can be assigned to any individual cell in the matrix, or alternatively to a whole row or column, thereby overruling previous actions. For large matrices, fish-eye techniques, or focus and context techniques, may be used to maintain overview, while presenting part of the matrix in sufficient detail to be inspected and processed. Such techniques are known per se.

In an embodiment of the invention, multiple profiles may be stored in the apparatus, enabling a plurality of persons to access their own personal profile. In a preferred embodiment, one of said profiles is a default one, and selected automatically at power on. The default profile preferably assigns a positive rating to all value combinations, in other words, all programs received are available in the zap-circle and the EPG. The default profile could be taken as a departure for creating a personal profile, requiring the user to enter disliked value combinations only. Alternatively, a profile comprising only negative ratings could be taken as a departure, which is more appropriate for creating a very selective profile. As another alternative, users may be allowed to choose from among a series of predefined stereotype profiles. If necessary, the users could further refine these stereotype profiles in accordance with their own interests.

A further embodiment according to the invention is characterized in that the profiling means are adapted to present at least a part of the value combinations of a user profile on the display screen, and to indicate which of the presented value combinations correspond to a program which is being received simultaneously. For example, the TV screen may be utilized to present the user profile as a matrix, enabling the user to edit the ratings of cells, rows and columns. In this embodiment the same matrix representation is used to provide a quick overview of those programs, i.e. value combinations, that are currently broadcast. Various graphic techniques may be applied to convey the information, e.g. different background colors for positive and negative ratings and icons to indicate actual reception.

The invention is particularly suitable for television or radio receivers, set-top boxes and video recorders.

These and other aspects of the invention are apparent from and will the elucidated, by way of a non-limitative example, with reference to the embodiment(s) described hereinafter.

BRIEF DESCRIPTION OF THE DRAWING

In the drawings,

FIG. 2 shows an example of a screen representation of a user profile.

DESCRIPTION OF THE PREFERRED EMBODIMENTS

Figure 1:
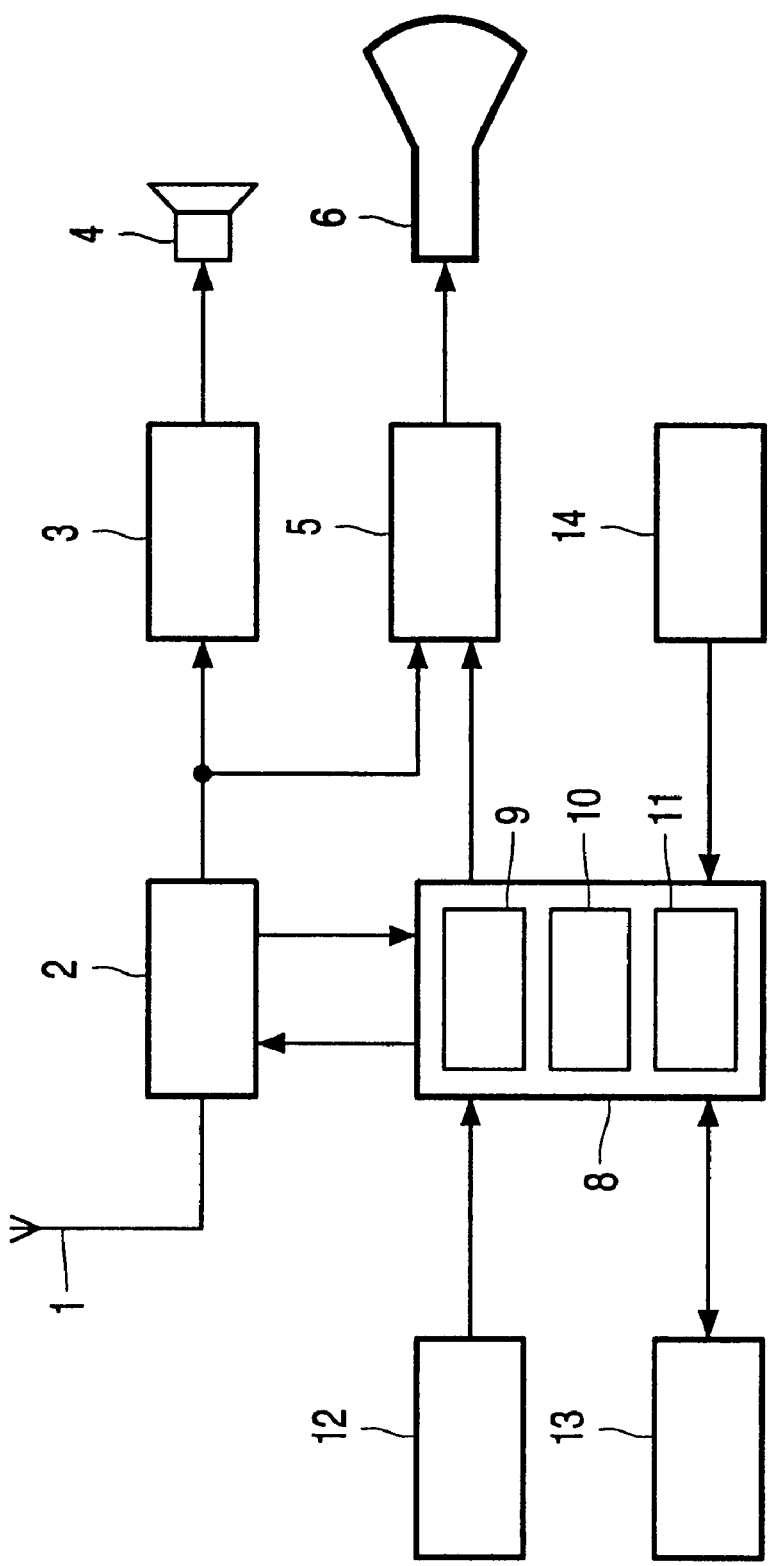
FIG. 1 shows a diagram of a television receiver as an embodiment of the apparatus according to the invention.

FIG. 1 shows a diagram of a TV-set as an embodiment of the apparatus according to the invention. TV signals are received from the air by an antenna 1 or, alternatively, from a cable network. One of the TV signals is selected by a tuner 2, decoded and split into an audio signal, a video signal and a data signal. The audio signal is further processed by an audio processor 3 and a loudspeaker 4. The video signal is further processed by a video processor 5 and presented on a screen 6. The data signal is transmitted to a central processing unit (hereinafter "CPU") 8, which comprises one or more microprocessors capable of executing program instructions stored in a read-only memory (hereinafter "ROM") 14. These program instructions comprise parts of software modules including, inter alia, a zap-control module 9, an EPG module 10 and a profile module 11. Data processed by said software modules, e.g. EPG data and user profile information, may be store in a non-volatile memory 13. The CPU 8 is capable of controlling functions of the TV-set and transmitting data to the video processor 5 to be presented on the screen 6. A user control unit 12 receives user commands, e.g. through a remote control (not shown), and transmits them to the CPU 8 to be processed. For example, when the user enters a channel number, the CPU 8 controls the tuner 2 to select the corresponding channel, and sends data to the video processor 5 to present feedback on the screen 6, e.g. the preset number, the channel name and the program category are displayed for a few seconds. When the user issues a zap-command, e.g. by pressing either of the up/down keys of the remote control, the same feedback is presented and the zap-control module 9 invokes control of the tuner 2 to select a channel which is arranged after or before the current channel.

The data signal is decoded from the TV signal by means of a teletext decoder (not shown), and includes, inter alia, EPG data which provide an overview of programs scheduled for the near future. For each program, the EPG data may comprise attributes such as a title, the start time and duration, the channel number, and category information. In response to a predetermined user command, the EPG module 10 invokes presentation of a program schedule on the screen 6. The data signal further comprises a code which indicates the program category of the program currently being broadcast. In an alternative embodiment, the data signal comprises an identification of the current program, which can be used to obtain the program category from the related category information in the EPG. Transmission of such a program identification is known per se, e.g. from the Program Delivery Control (PDC) system.

The profile module 11 enables one or more user profiles to be defined and stored in the memory 13. A user profile comprises a plurality of ratings, one for each combination of a channel and a program category. A rating gives a measure of the expected appreciation of a program having a channel number and a program category in accordance with the corresponding combination. In the simplest case, the ratings are binary: positive or negative. Multiple profiles may be defined, e.g. to suit the taste of more persons. In a preferred embodiment, each profile is associated with a particular color, and selected by pressing a colored button on the remote control. Such colored buttons are known per se, and operative in, for example, a teletext or menu selection mode, thereby corresponding to colored options on the TV screen. When not in one of said modes, a user profile may be selected by pressing the related button, e.g. the 'blue' user profile is selected by pressing the blue button. One button selects a default profile which is also selected automatically at power-on and preferably comprises positive ratings only. In an alternative embodiment, user profiles may be selected from an on-screen menu by pressing a dedicated button, or by entering an identification, e.g. a name or a number. All user profiles, except for the default profile, may be password-protected.

The profile module 11 is capable of controlling the video processor 5 to present a user profile on the screen 6. FIG. 2 shows an example of a screen representation of a user profile. The profile is represented by a matrix, each row corresponding to a program category and each column corresponding to a channel. The user can assign a positive rating to a combination of a channel and a program category by placing a check mark in a field belonging to both the channel's column and the category's row. A field without a check mark represents a negative rating. A field is accessed by means of a jumping highlight which is controlled by up/down and left/right buttons on the remote control. Check marks can be placed or removed by toggling a dedicated edit button on the remote control. Any other common technique for positioning a cursor or a highlight may be applied, e.g. a computer mouse or a track ball. In the example of FIG. 2, the highlight, indicated by a dashed rectangle, is at the field which relates to the BBC1 channel and the movie program category. Pressing the edit button would cause the check mark in said field to be removed. In the example, the user has entered a positive rating for movies at NED2, BBC1 and WDR3, and for sports, music and shows at BBC2.

A field heading a row or column can be accessed too. When the edit button is pressed while such a field is highlighted, a check mark is placed in all fields of the corresponding row or column. Pressing the edit button again causes all check marks in the corresponding row or column to be removed. This provides a convenient way of assigning the same rating to all programs from a particular channel or particular category. Subsequent operations on individual fields override earlier settings.

For each channel, a field which matches the current program is distinguished by a different background color, enabling the user to inspect the current program offer at a glance. In the example, WDR3 is currently broadcasting a news program, NED2 and BBC1 a sports program, BBC2 a movie and NED1 a show. The profile matrix representation provides an alternative way of selecting a particular channel, specifically by moving the cursor or the highlight to the appropriate column and pressing a dedicated button, e.g. a confirmation ('OK') button which may also be used to confirm setting and menu selections.

The matrix can be scrolled in the vertical and horizontal direction to display further channels and categories. This is achieved by moving the cursor or highlight to the border of the matrix in the desired scroll direction. Alternatively, any well-known technique for scrolling images may be applied, e.g. scroll bars or dedicated scroll buttons on the remote control. In a preferred embodiment, the user may select a fish-eye view for presenting the matrix, whereby the part of the matrix near the highlight is shown in full detail whereas the remainder of the matrix is shown in sufficient detail to indicate the location of the highlight within the matrix. Scrolling through the matrix changes the position of the detailed part with respect to the global part.

The selected user profile influences the behavior of the zap control module 9 and the EPG module 10. The zap control module 9 defines a zap-circle of channels, which normally contains all receivable channels ordered in accordance with their preset number. If a user-profile is selected, the zap-circle is limited to those channels broadcasting a program with a positive rating for the resulting combination of channel name and program category. In the example, the zap-circle would at least comprise NED1, NED2 and WDR3, but not BBC1 and BBC2. Cycling through the adapted zap-circle is accomplished by means of the usual zapkeys, preferably the up/down keys on the remote control. Furthermore, the colored button associated with the user profile performs the same function as the up-key, enabling the user to select a user profile and cycle through the corresponding zap-circle using only one button.

The EPG is influenced by the selected user profile in a similar way. Normally, the EPG presents a complete schedule of all channels. When a user profile is selected, the EPG shows for each channel only the programs having a positive rating. If there are no such programs, the channel is omitted as a whole. As a consequence, less information needs to be displayed, rendering the presented EPG more concise.

In an advanced embodiment, the zap-circle and the EPG information are sorted. The most interesting channels, i.e. those having the most positively rated programs, are put in front, whereas channels having fewer or no programs with a positive rating are put in the rear. This further improves the accessibility of a user's favorite programs.

Instead of like/dislike markers, non-boolean ratings may be applied, e.g. numerical ratings between 0 and 9. In that case, the channels could also be sorted in accordance with these ratings, thus grouping programs having a similar rating. Programs having a rating below a threshold are excluded from the zap-circle and the EPG. Whenever a program change occurs, the zap-circle and the EPG are sorted again to reflect the new situation. For example, when the news program of WDR3 has ended and is succeeded by a show, WDR3 is removed from the zap-circle and the EPG. When the sports program of BBC1 is succeeded by a movie, BBC1 is included in the zap-circle and the EPG.

The invention is particularly suitable for digital TV-sets, set-top boxes and video recorders, since digital techniques allow simultaneous reception of a large number of channels, In that case, TV channels are provided as services which are multiplexed in a digital broadcast stream, e.g. adhering to the Digital Video Broadcasting (DVB) standard, which is widely applied. EPG and category information is provided as part of the related service information (DVB-SI), which is also included in the DVB stream. Although additional components are required for demultiplexing and decoding content and SI information, these differences are not essential for the invention. Still, by rating combinations of attribute values such as channel name and program category, zap-lists may be shortened and EPGs made more concise.

Instead of the ZAP-control module 9, the EPG module 10 and the user profile module 11 being entirely located in, for example, a TV-set or set-top box (STB), it may be partially or as a whole be located in a remote control for controlling such a TV or STB. The software could be built into the remote control while the EPG data may be downloaded at regular intervals, e.g. once a week, possibly via intermediate storage on a PC or STB. Before transferring the EPG data from the PC or STB to the remote control it may be filtered in accordance with a user profile, in order to limit the amount of data to be transmitted and stored in the memory of the remote control. For example, only information related to programs having a rating exceeding a certain threshold may be downloaded into the remote control. Furthermore, one or more user profiles may be transferred to the remote control. The interaction with the user may proceed through a touch sensitive LCD display built in the remote control. For example, a user profile is viewed and EPG data is browsed on the remote control's LCD screen, so without disturbing the image as presented on the TV or STB, and without requiring the user to read such data from the distant TV screen. In this way, it is achieved that the remote control is capable of independently interpreting the user's commands in respect of a user profile, favorite channel or genre list. For example, the remote control according to the invention may interpret zap commands in such a way that only channels are selected which are currently broadcasting a program having a high rating for the respective channels. The remote control may then transmit appropriate infrared signals, e.g. representing a channel number of a suitable number of 'channel up' commands, to control the TV or STB for tuning to the desired channel. This has the advantage, that the method according to the invention can be applied to TVs and STBs which, for example, do not support user profiles and/or EPGs. If the remote control is a universal and/or learnable remote control, it is further possible to control a plurality of TVs, STBs and videorecorders using the same user profile and zap control module. Updates of user profiles, or suggestions for such updates, may be fed back to the TV or STB. For example, the remote control may be arranged to record the user's viewing history and, if necessary, update the user's profile accordingly, after which the updates are communicated to the TV or STB.

Although the invention has been described with reference to particular illustrative embodiments, variations and modifications are possible within the scope of the inventive concept. Thus, for example, instead of check marks, different colors may be used to distinguish, e.g. red for a negative rating and green for a positive rating, while actual reception may be indicated by an icon or a check mark. When very few programs having a positive rating are being received, the apparatus may switch to the default profile automatically or, in the case of non-boolean ratings, a rating threshold may be lowered gradually. User profiles may be made even more precise by allowing combinations of more than two attribute values. Furthermore, generating or fine-tuning user profiles and keeping them up-to-date could also be done with the help of a habit-watching module. For example, a positive rating could be assigned automatically to a particular attribute combination if that combination corresponds to a predetermined percentage of the programs watched in a particular period of time.

In summary, the invention relates to an apparatus for receiving a multitude of programs which may be classified by a first and a second attribute. For example, a program may be classified by a channel name and a program category. The apparatus is capable of defining one or more user profiles which comprise ratings for some or all combinations of values of the first and the second attribute. Thus, a user can supply preferences in a very precise way. The user profile influences the behavior of various components, such as the zap function and the electronic program guide.

What is claimed is:

1. An apparatus for receiving a multitude of programs, said programs being classified by at least a first and a second attribute, the apparatus comprising user-operable profiling means for defining a subset of said multitude of programs constituting a user profile, wherein the user profile comprises a rating for a value combination of at least a value of the first attribute and a value of the second attribute, the rating determining whether a program classified by said value combination is a member of said subset.

2. An apparatus as claimed in claim 1, wherein the first attribute is a channel name and the second attribute is a program category.

3. An apparatus as claimed in claim 1, the apparatus comprising zap means for sequentially selecting members of said multitude of programs, wherein the profiling means are adapted to control the zap means in accordance with said rating to sequentially select the members of said subset only.

4. An apparatus as claimed in claim 1, the apparatus comprising an electronic program guide, wherein the profiling means are adapted to control the electronic program guide in accordance with said rating to present program information relating to the members of said subset only.

5. An apparatus as claimed in claim 1, wherein the profiling means are arranged to simultaneously assign the same rating to all value combination which contain a specific value of a specific attribute.

6. An apparatus as claimed in claim 1, the apparatus having a display screen, wherein the profiling means are adapted to present the user profile on the display screen as a matrix, each row of which is identified by a value of the first attribute and each column by a value of the second attribute.

7. An apparatus as claimed in claim 6, wherein the profiling means are further adapted to present a focus part of said matrix in fall detail, and to present a major part of said matrix in lower detail and indicate the location of said focus part with respect to said major part.

8. An apparatus as claimed in claim 1, wherein the profiling means are adapted to store multiple user profiles and means for selecting each one of the user profiles.

9. An apparatus as claimed in claim 8, wherein the profiling means comprise a default user profile designating all value combinations as members of said subset.

10. An apparatus as claimed in claim 1, the apparatus having a display screen, wherein the profiling means are adapted to present at least a part of the value combinations of a user profile on the display screen, and to indicate which of the presented value combinations correspond to a program which is being received.

11. A method of establishing a subset of a multitude of programs, said programs being classified by at least a first and a second attribute, the method comprising a step of defining a user profile, wherein the method further comprises a step of assigning a rating for a value combination of at least a value of the first attribute and a value of the second attribute, the rating determining whether a program classified by said value combination is a member of said subset.

12. A remote control device for controlling an apparatus for receiving a multitude of programs, comprising user operable profiling means for defining a subset of said multitude of programs constituting a user profile, the user profile comprising a rating for a value combination of at least a value of the first attribute and a value of the second attribute, the rating determining whether a program classified by said value combination is a member of said subset.

13. A remote control device as claimed in claim 12, comprising zap means for sequentially selecting members of said multitude of programs, the profiling means being adapted to control the zap means in accordance with said rating to sequentially select the members of said subset only.

14. A remote control device as claimed in claim 12, comprising an electronic program guide, the profiling means being adapted to control the electronic program guide in accordance with said rating to present program information related to the members of said subset only.

* * * * *

UNITED STATES PATENT AND TRADEMARK OFFICE
CERTIFICATE OF CORRECTION

PATENT NO.     : 6,493,688 B1
DATED          : December 10, 2002
INVENTOR(S)    : Duco A.D. Das et al.

It is certified that error appears in the above-identified patent and that said Letters Patent is hereby corrected as shown below:

Column 7,
Line 36, change "fall" to -- full --.

Signed and Sealed this

Sixth Day of May, 2003

JAMES E. ROGAN
*Director of the United States Patent and Trademark Office*